July 6, 1937.  A. L. DUNN  2,086,070
FISH TENDERLOINING MACHINE
Filed May 29, 1935  3 Sheets-Sheet 1

INVENTOR.
Alton L. Dunn
BY
ATTORNEY.

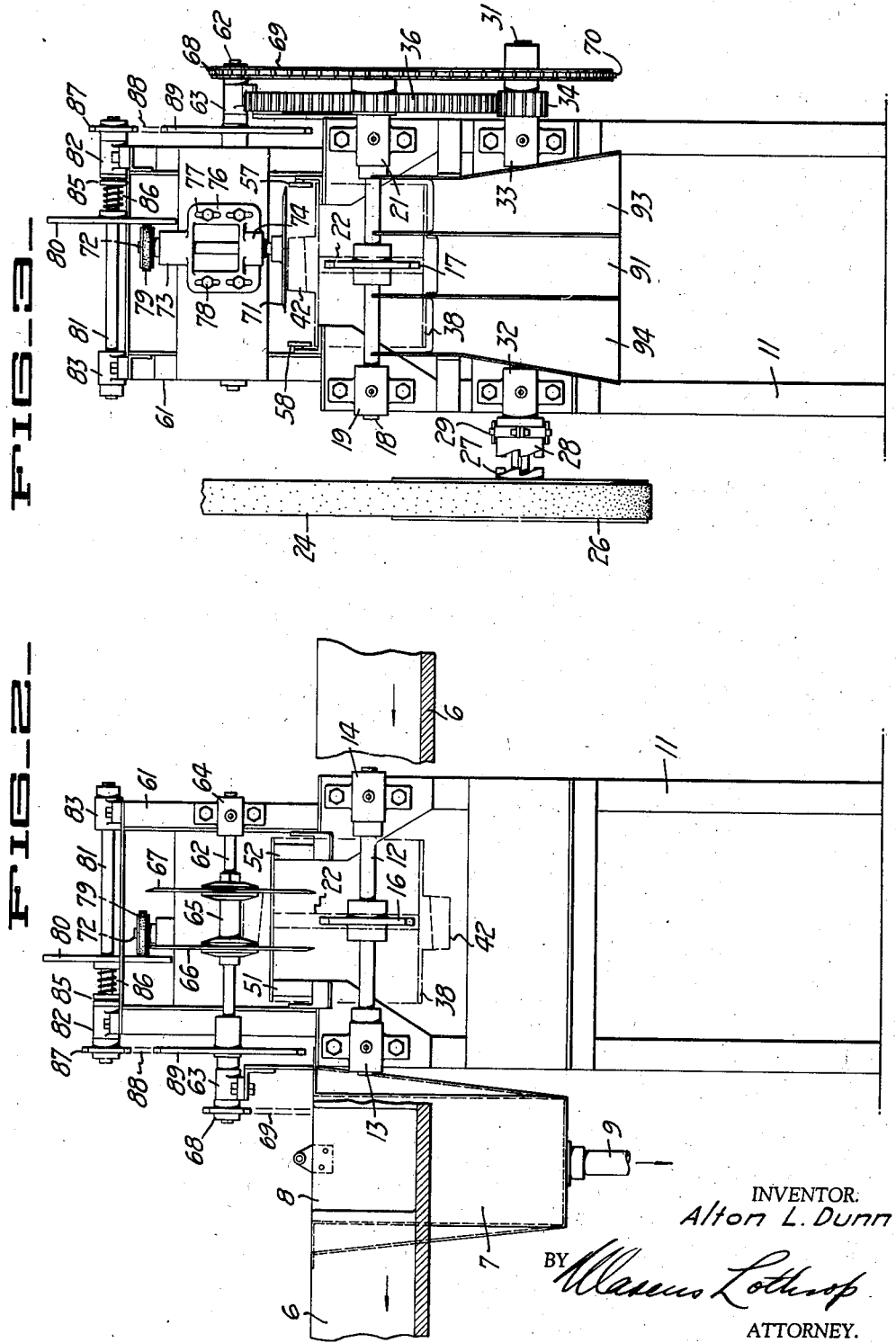

July 6, 1937. A. L. DUNN 2,086,070
FISH TENDERLOINING MACHINE
Filed May 29, 1935 3 Sheets-Sheet 3
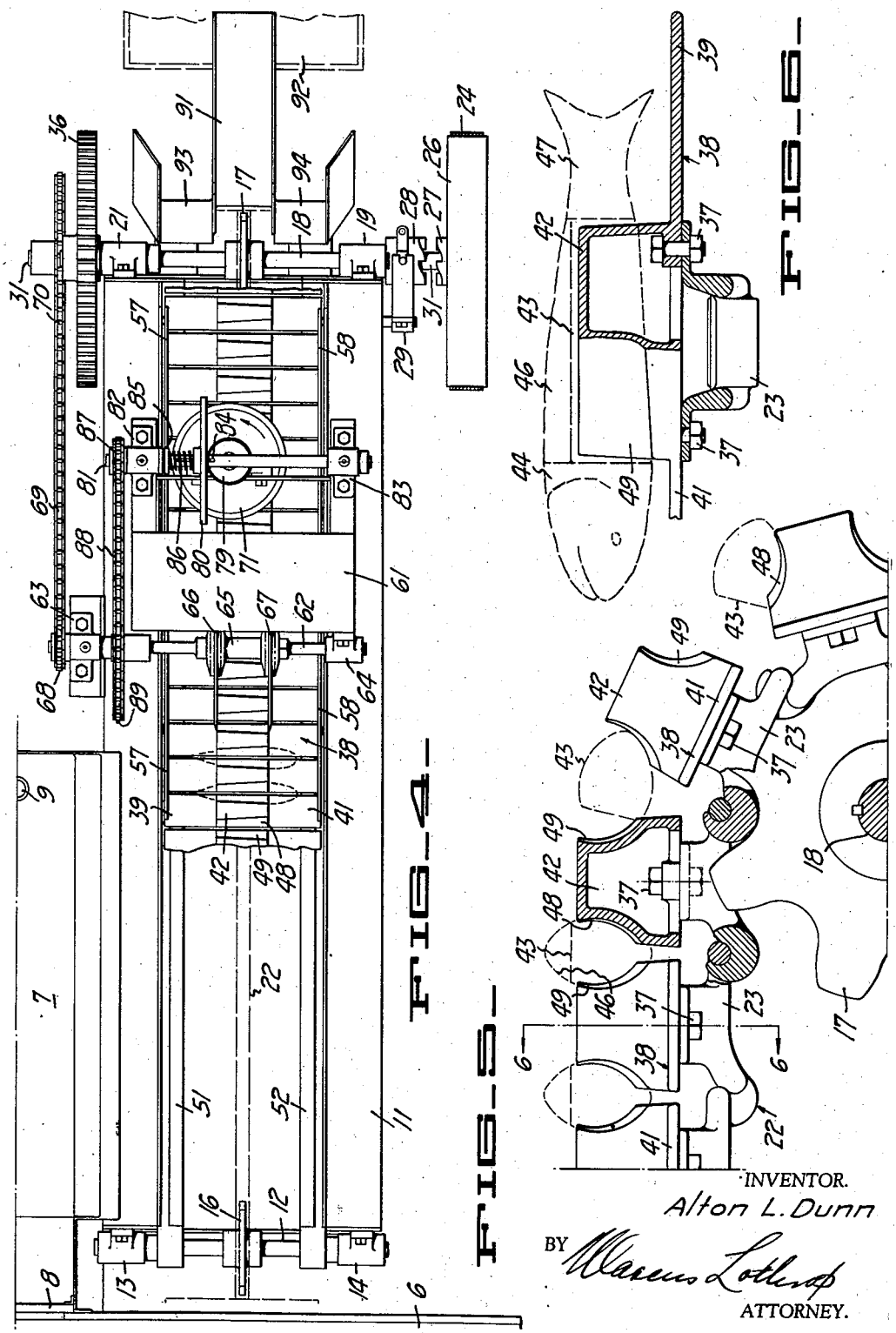
INVENTOR.
Alton L. Dunn
BY
ATTORNEY.

Patented July 6, 1937

2,086,070

UNITED STATES PATENT OFFICE 2,086,070

FISH TENDERLOINING MACHINE

Alton L. Dunn, Benicia, Calif., assignor to Benicia Fisheries, Benicia, Calif., a corporation of California Application May 29, 1935, Serial No. 24,018

6 Claims. (Cl. 17—3)

My invention relates to means for cutting fish of the pilchard type into portions which are to be further processed or canned, and into other portions which are to be differently treated. More particularly, my invention relates to means for dealing with fish of the pilchard family which are approximately eight to twelve inches in length and which are in part very desirable for table use and in part less desirable for human consumption. The head, tail and belly portions are preferably not utilized, whereas the remaining part of the fish (referred to herein as the "tenderloin") is especially esteemed as a delicacy.

An object of my invention is to provide a machine for automatically cutting to a predetermined size successive fish in a run in order to provide edible portions of uniform size.

Another object of my invention is to provide a machine for cutting from a fish all portions which are not desirable for human consumption.

Another object of my invention is to provide a machine for receiving and holding a fish securely while it is being cut into portions of predetermined size.

A further object of my invention is to insure removal of undesired portions of fish, even with fish of somewhat different size.

The foregoing and other objects are attained in the embodiment of the invention illustrated in the drawings, in which—

Fig. 2 is an end elevation of the machine shown in Fig. 1, portions of the conveyor being removed and portions of the fish feeding trough being omitted.

Fig. 3 is an end elevation of the discharge end of the machine, portions of the conveyor chain being omitted.

Fig. 4 is a plan of the machine, portions of the conveyor being removed.

Fig. 5 is a detail showing to an enlarged scale a portion of the conveyor chain, one of the blocks being disclosed in cross-section.

Fig. 6 is for the most part a cross-section the plane of which is indicated by the line 6—6 of Fig. 5.

Figure 1:
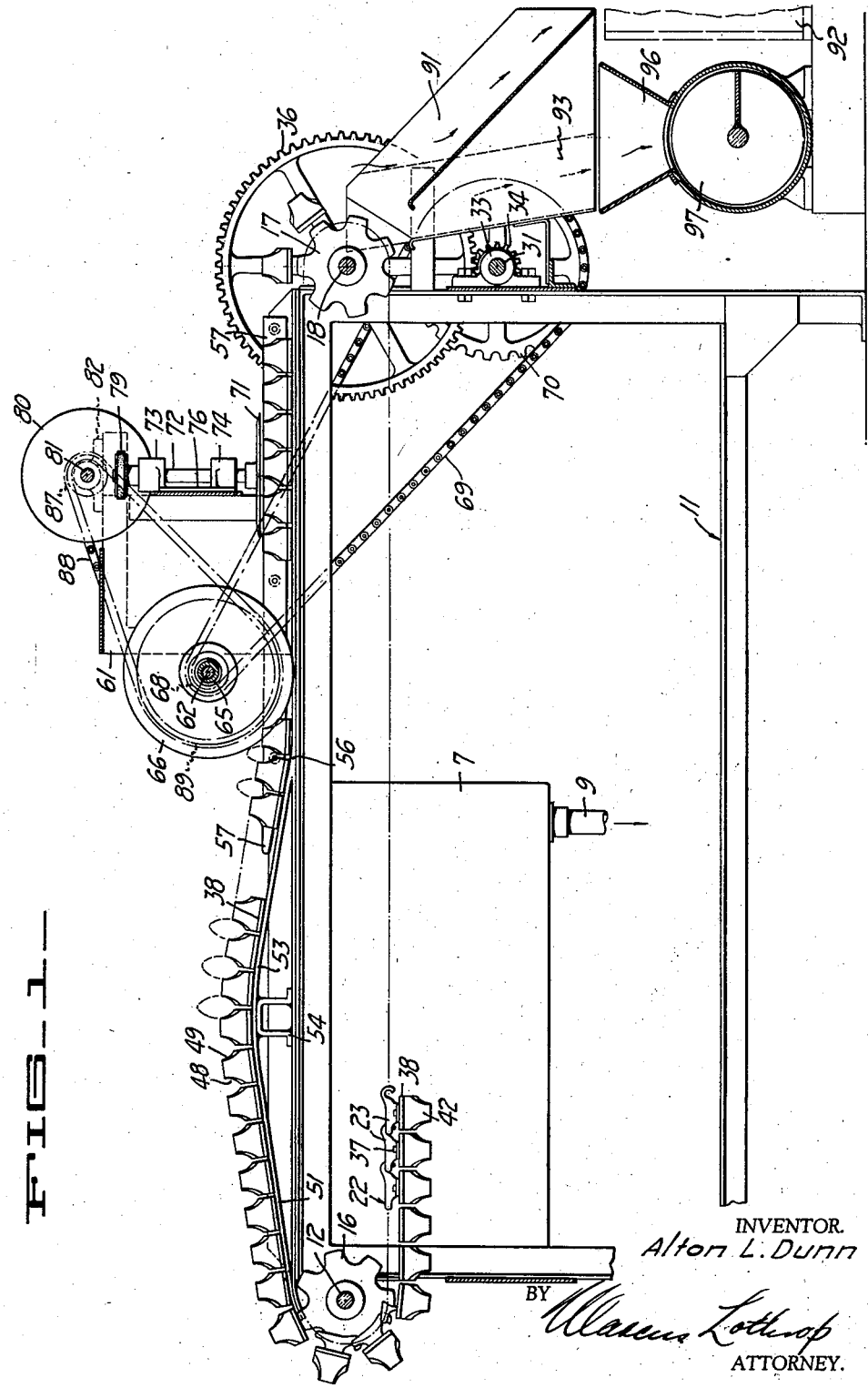
Fig. 1 is a cross-section on a vertical, longitudinal plane of a fish tenderloining machine constructed in accordance with my invention.

In its preferred form the fish tenderloining machine of my invention includes a plurality of knives arranged to cut a rectangular portion from a fish, together with means acting to receive a fish and to grip the fish for severance of the undesired portions therefrom and subsequently to release the gripped portion of the fish from the mechanism.

Although the device of my invention is susceptible to use in various different environments, it is particularly useful in conjunction with providing a relatively standard size product from successive fish of the pilchard or mackerel type. Such fish, after being received at the cannery, are floated in water in a trough 6 which leads from the source to a battery of machines of the type disclosed herein. At or adjacent to each machine there is a tank 7, into which some of the fish can be diverted by opening a gate 8, while a drain pipe 9 serves as a means for discharging water and débris from such tank.

Arranged alongside of the feed tank 7 is the machine of my invention, which incorporates a framework, generally designated 11, constructed of suitable structural shapes. This framework is provided at one end with a cross-shaft 12 mounted in journals 13 and 14 for ready rotation, and carrying adjacent its center a sprocket 16. In line with such sprocket, but at the opposite end of the machine, is a comparable sprocket 17 which is mounted upon a cross-shaft 18 journaled in bearings 19 and 21 secured to the framework 11. Trained around the sprockets 16 and 17 is a conveyor chain 22 made up of a plurality of individual, identical links 23.

The chain and, correspondingly, the two sprockets 16 and 17 are driven and advanced by rotation of the shaft 18 from a source of power (not shown). The drive is from a belt 24, for instance, to a pulley 26 carrying one member 27 of a dog clutch, the other member 28 of which is shiftable by means of a shift mechanism 29 to engage or release the machine from the source of power. When engaged, the clutch is effective to transmit power to a shaft 31 carried in journals 32 and 33 on the framework 11 and provided with a pinion 34 meshing with a gear 36 at the extremity of the shaft 18, so that the conveyor chain 22 is propelled.

In order to receive and grip the fish for further operation, I preferably provide on the conveyor chain 22 jaw means for contacting with each individual fish. Preferably, each of the links 23 is fastened by means of a pair of bolts 37 to a cross-plate 38 having extensions 39 and 41 thereon and adjacent its central portion given the form of a block 42 of approximately the contour and outline of the portion of the fish which is to be severed and retained. This portion is indicated in Fig. 6 by the dotted line 43, the fish portion within such dotted line being termed the "tenderloin". The head portion 44, the belly portion 46 and the tail portion 47 are not retained by the gripping structure and are treated otherwise than the tenderloin. Each of the blocks 42 on its opposite longitudinal edges is formed with somewhat tapered concavities 48 and 49. The concavities or jaws on adjacent blocks co-operate to form a cradle or receptacle approximating the external contour of a fish and are especially adapted to receive and contact a fish placed therein.

In order that the operators taking fish from the trough 7 will have no difficulty in properly positioning the fish in the jaws formed by the successive blocks 42, I provide on the framework 11 means for spreading or separating the blocks with respect to each other and in effect opening the gripping jaws 48 and 49. This means in the present instance takes the form of a pair of guide rails 51 and 52, given the form of an ogee curve having a convex portion 53 spaced from the framework by a channel 54, and a concave portion 56 which is disposed adjacent the middle portion of the framework. The guides 51 and 52 underlie the extensions 39 and 41, so that the upper run of the conveyor does not assume a rectilinear path but rather follows a sinuous, undulatory path, as shown in Fig. 1.

At the convex portion 53 of the curve, the jaws 48 and 49 of the successive blocks are spread apart so that an operator can place fish from the tank 7 with their heads in either direction but preferably to conform to the taper of the blocks and with their bellies up and resting with their back or tenderloin portions between the jaws 48 and 49. Then, as the conveyor advances to the concave portion 56 of the ogee curve, the blocks approach each other more closely and the fish are gripped, although not so tightly as to injure the flesh thereof. Adjacent this portion of the travel of the conveyor additional guides 57 and 58 are provided, to preclude buckling or other undesired movement of the blocks 42.

Since, after passing the receiving station adjacent the convex portion 53, the fish are gripped properly in location so that the tenderloin portions thereof are contacted, the fish are ready for the severing operation, which preferably takes place at a cutting station adjacent the concave portion 56.

At such station the framework is provided with an upright superstructure 61 of the customary structural shapes, on which is mounted a cross-shaft 62 carried by journals 63 and 64, respectively. Adjacent the central portion of the shaft, a changeable spacer 65 predetermines the distance between a pair of circular cutting knives 66 and 67, respectively, which are arranged to override the ends of the blocks 42 by a small amount so that somewhat of a shearing action can take place therebetween. The knives are preferably driven at a relatively high rate of speed by means of a drive connection from a small sprocket 68 on the cross-shaft 62, which is connected by a chain 69 to a relatively large sprocket 70 on the main drive shaft 31. As the fish progress in their gripped condition through the cutting station, the head portion 44 and the tail portion 47 are severed by the knives 66 and 67, respectively.

But, in addition, I provide in accordance with my invention means for severing the belly portion 46 by a cut which is substantially at right angles to the cut made by the knives 66 and 67, so that the three cuts together form a polygonal, channel-like figure. That is to say, there is suspended over the upper surface of the successive blocks 42 a circular cutting knife 71 which is arranged to have a shearing action with the upper surface of the blocks 42 in order to cut the belly portion 46 from the remainder of the fish. This knife is carried on a vertical shaft 72 mounted in journals 73 and 74 on a plate 76. The plate 76 is movable vertically on its mounting by means of elongated apertures 77 through which fastenings 78 extend to the frame 61. By suitably loosening the fastenings and adjusting the plate 76, the height of the knife 71 can be varied.

In order to drive the knife 71, the shaft 72 at its upper end carries a relatively small friction wheel 79 which engages frictionally a drive disc 80 mounted on a shaft 81 journaled in bearings 82 and 83 on the frame 61. The drive disc 80 is preferably keyed, as at 84, to the drive shaft 81, so that it is axially movable thereon into and out of engagement with the wheel 79. To provide a resilient engagement there is a thrust bearing 85 mounted against the journal 82 and between which and the disc 80 a spring 86 is interposed. Thus, any requisite amount of pressure is imposed upon the friction drive. The shaft 81 is driven by a sprocket 87 mounted at one extremity thereof and connected by a chain 8 to a drive sprocnet 89 on the shaft 62.

After the fish have passed between the knives 66 and 67 and have had their heads and tails severed thereby (which heads and tails fall upon the extensions 39 and 41, respectively), they come to the rapidly revolving horizontal knife 71 which severs the belly portions 46 and which, due to the direction of its rotation, carries the belly portions over until they fall upon the extensions 39. Further movement of the conveyor causes the links 23 to round the sprocket 17, during which movement the successive blocks 42 are spaced far apart circumferentially, thereby releasing the previously gripped tenderloin portion to fall into a chute 91 which extends to a suitable receiving receptacle 92. At the same time the extension 39 discharges its burden into a chute 93, and the extension 41 discharges its burden into a chute 94, both chutes in turn releasing the material into a hopper 96 giving onto a spiral conveyor 97 for carrying this material to a point of subsequent treatment.

I claim:

1. A fish tenderloining machine comprising a frame, a plurality of cutting knives arranged on said frame to define a polygonal figure, and means on said frame for receiving a fish, carrying said fish to be cut by said knives, gripping said fish against displacement by said knives, and releasing said cut fish.

2. A fish tenderloining machine comprising a frame, a plurality of rotatable cutting knives arranged on said frame to define a polygonal figure, means for rotating said knives, and means on said frame for initially gripping a fish to be cut by said knives and holding said fish against displacement by said knives and finally releasing said fish.

3. A fish tenderloining machine comprising a frame, sprockets on said frame, a conveyor chain trained around said sprockets to provide an upper run and a lower run, means on said frame for guiding said upper run in the path of an ogee curve, fish-gripping jaws projecting upwardly from the upper run of said conveyor, and cutting knives on said frame located adjacent the concave portion of said ogee curve.

4. A fish tenderloining machine comprising a frame, a chain, means on said frame for guiding said chain in a path a portion of which is an ogee curve, and blocks on adjacent links of said chain, each of said blocks having shallow concavities on opposite sides thereof extending generally crosswise of said chain.

5. A fish tenderloining machine comprising a frame, a moving chain, means for guiding said chain in a concave curve and in a convex curve, and a pair of fish-holding blocks on said chain adapted to be moved toward and away from each other as said chain moves through said concave curve and said convex curve.

6. A fish tenderloining machine comprising a conveyor, a pair of fish-holding blocks on said conveyor, and means for cutting the belly from a fish held in said blocks and depositing said belly upon said conveyor.

ALTON L. DUNN.